(12) United States Patent
Wang

(10) Patent No.: US 8,594,184 B2
(45) Date of Patent: Nov. 26, 2013

(54) METHOD AND APPARATUS FOR CONTROLLING VIDEO-AUDIO DATA PLAYING

(75) Inventor: Xinliang Wang, Shenzhen (CN)

(73) Assignee: Tencent Technology (Shenzhen) Company Limited, Shenzhen, Guangdong Province (CN)

( * ) Notice: Subject to any disclaimer, the term of this patent is extended or adjusted under 35 U.S.C. 154(b) by 416 days.

(21) Appl. No.: 13/097,291

(22) Filed: Apr. 29, 2011

(65) Prior Publication Data

US 2011/0205427 A1 Aug. 25, 2011

Related U.S. Application Data

(63) Continuation of application No. PCT/CN2010/070614, filed on Feb. 10, 2010.

(30) Foreign Application Priority Data

Feb. 18, 2009 (CN) .......................... 2009 1 0077340

(51) Int. Cl.
*H04B 1/66* (2006.01)
*H04N 5/84* (2006.01)

(52) U.S. Cl.
USPC ..................................... 375/240.01; 386/335

(58) Field of Classification Search
USPC ............ 348/441, 739, 96; 386/230, 326, 338, 386/335; 375/240.01–240.24
See application file for complete search history.

(56) References Cited

FOREIGN PATENT DOCUMENTS

| CN | 1321026 A | 11/2001 |
|---|---|---|
| CN | 101064838 A | 10/2007 |
| CN | 101119323 A | 2/2008 |
| CN | 101123571 A | 2/2008 |
| CN | 101500117 A | 8/2009 |

OTHER PUBLICATIONS

International Search Report: mailed May 13, 2010; PCT/CN2010/070614.
Chinese First Office Action; Appln. No. 200810167764.4.

*Primary Examiner* — Behrooz Senfi
(74) *Attorney, Agent, or Firm* — Ladas & Parry LLP

(57) ABSTRACT

The embodiments of the present invention disclose a method for controlling video-audio data playing, which relates to the network communication field. The method includes: obtaining total duration of playing video-audio data in a buffer; calculating a time difference, the time difference being a difference between a current time point and a time point of receiving a latest video-audio data packet; and performing time domain stretch processing for video-audio data in the buffer when the total duration and the time difference satisfy a preset condition, and playing the processed video-audio data. The embodiments of the present invention also disclose an apparatus for controlling video-audio data playing. By using the method and apparatus, the incontinuity phenomena will be decreased when the video-audio data is played, so as to improve user experiences.

6 Claims, 3 Drawing Sheets

METHOD AND APPARATUS FOR CONTROLLING VIDEO-AUDIO DATA PLAYING

FIELD OF THE INVENTION

The present invention relates to network communication technologies, and more particularly to a method and apparatus for controlling video-audio data playing.

BACKGROUND OF THE INVENTION

With the development of Internet, more and more users communicate with each other on the Internet. With users' further requirements for communication and the further development of the Internet, the users can communicate with each other on the Internet not only through characters but also through video-audio data.

In the prior art, since data transmission on the Internet is based on a Transmission Control Protocol/Internet Protocol (TCP/IP), when video-audio data are transmitted on the Internet, it is needed to divide the video-audio data into multiple data packets according to the TCP/IP and transmit the multiple data packets on the Internet by taking a frame as a unit. Since the network structure of the Internet is complex, the transmission rate of the data packets transmitted on the Internet can not be controlled effectively, and a receiving end of the video-audio data sometimes can not receive the video-audio data for a long time, which results in disconnection or incontinuity phenomena when the video-audio data is recovered and played, e.g. audio incontinuity, call mute, video image standstill and so on.

In order to solve the problem, a buffer is usually configured on the receiving end of the video-audio data to store some video-audio data, and the video-audio data are received from the network, and then decoded and to be played, so as to decrease the above phenomena. But the capacity of the buffer is limited, if the buffer does not receive subsequent video-audio data after the video-audio data in the buffer has been played, the incontinuity phenomena will occur when video-audio data is played, which decreases user experiences.

SUMMARY OF THE INVENTION

Embodiments of the present invention provide a method and apparatus for controlling video-audio data playing, so as to decrease the incontinuity phenomena when video-audio data is played and improve user experiences.

The technical solutions provided by the embodiments of the present invention are implemented as follows.

A method for controlling video-audio data playing includes:

obtaining total duration of playing video-audio data in a buffer;

calculating a time difference, the time difference being a difference between a current time point and a time point of receiving a latest video-audio data; and performing time domain stretch processing for the video-audio data in the buffer when the total duration and the time difference satisfy a preset condition, and playing the processed video-audio data.

An apparatus for controlling video-audio data playing includes:

an obtaining unit, configured to obtain total duration of playing video-audio data in a buffer;

a calculating unit, configured to calculate a time difference, the time difference being a difference between a current time point and a time point of receiving a latest video-audio data packet; and a processing unit, configured to perform time domain stretch processing for the video-audio data in the buffer when the total duration and the time difference satisfy a preset condition, and play the processed video-audio data.

As can be seen from the above technical solutions, in the embodiments of the present invention, by comparing the time difference with a preset condition and performing time domain stretch processing for the video-audio data according to a comparing result, the total duration of playing video-audio data in the buffer is increased, and when the video-audio data is played, the incontinuity phenomena caused because the receiving end can not receive a data packet for a long time is decreased, so as to improve user experiences.

DETAILED DESCRIPTION OF THE INVENTION

In order to make the object, technical solution and merits of the present invention clearer, the present invention will be illustrated in detail hereinafter with reference to the accompanying drawings and embodiments.

In the embodiments of the present invention, according to a short-term correlation between audio signals and by using a Waveform Similarity Overlap and Add (WSOLA) algorithm, one segment of audio signals is divided into shorter wave bands, and the wave bands are superimposed and combined to obtain a signal with a required playing duration. If the duration of playing the processed audio signals is longer than the duration of playing the original audio signals, which is equivalent to performing time domain stretch processing for the original audio signals, the duration of playing the original audio signals is prolonged. If the duration of playing the processed audio signals is shorter than the duration of playing the original audio signals, which is equivalent to performing time domain compacting processing for the original audio signals, the duration of playing the original audio signals is shortened.

Based on this idea, the embodiments of the present invention provide a playing control method to self-adaptively control the playing rate, so as to adapt to the incontinuity of receiving packets in the network. Specifically, when it is detected that no data are received for a long time, time domain stretch processing is performed for data to be played, so as to increase the duration of playing the data, thereby solving the playing incontinuity problem; further, when it is detected that the receiving rate of network data is too high, time domain compacting processing is performed for the data to be played, so as to decrease the duration of playing the data, thereby solving both the playing incontinuity problem and the delay problem. The time domain processing method only changes the playing rate, but does not influence the semanteme, and thus does not further influence user experiences.

Figure 1:
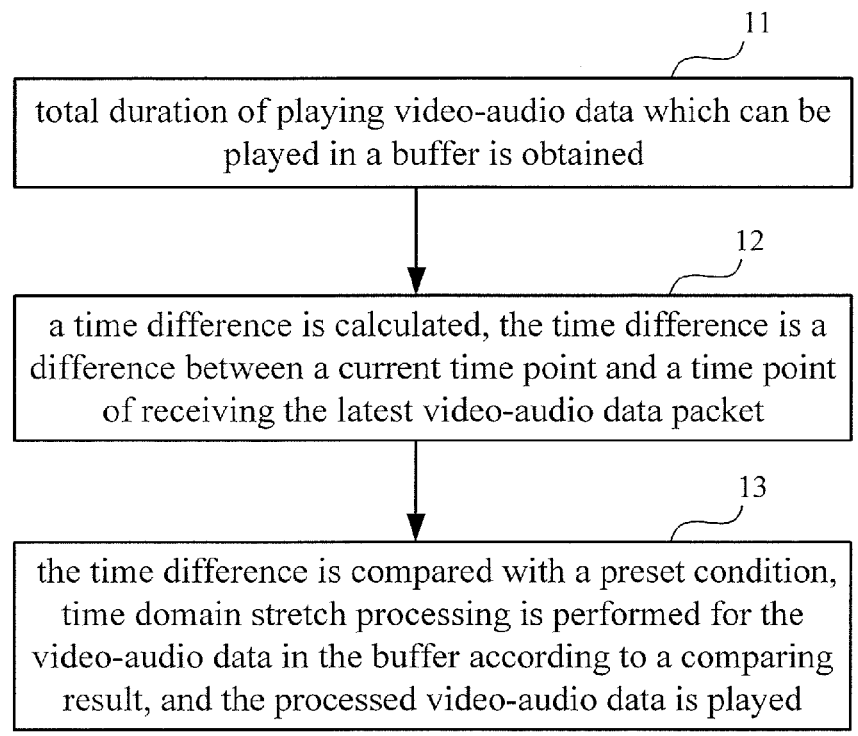
FIG. 1 is a flowchart illustrating a method for controlling video-audio data playing according to an embodiment of the present invention.

The embodiments of the present invention provide a method for controlling video-audio data playing, as shown in FIG. 1. The method includes following steps.

Step 11: total duration of playing video-audio data which can be played in a buffer is obtained.

In this step, the mode of obtaining the total duration of playing the video-audio data includes: obtaining the total duration of playing the video-audio data which can be played in the buffer in one process, or periodically obtaining the total duration of playing the video-audio data from the buffer. The embodiments of the present invention do not limit the obtaining times and mode.

Step 12: a time difference is calculated, and the time difference is a difference between a current time point and a time point of receiving the latest video-audio data packet.

Step 13: the time difference is compared with a preset condition, time domain stretch processing is performed for the video-audio data in the buffer according to a comparing result, and the processed video-audio data is played.

The time domain stretch processing method in Step 13 includes:

when determining that the time difference is larger than or equal to the total duration of playing the video-audio data which can be played in the buffer, or the total duration of playing the video-audio data which can be played in the buffer is smaller than or equal to preset minimum duration for the buffer, performing time domain stretch processing for the video-audio data in the buffer; otherwise, not performing the time domain stretch processing. The duration of playing the vide-audio data for which the time domain stretch processing is performed is not larger than two times of the duration of playing the original video-audio data. In actual applications, the times can be adjusted, e.g. 1.5 times, 2.5 times or 3 times, which is not limited by the embodiments of the present invention.

In addition, when the time domain stretch processing is performed for the video-audio data in the buffer, a determining condition is configured, i.e. when it is determined that the time difference is larger than or equal to the total duration of playing the video-audio data which can be played in the buffer, or the total duration of playing the video-audio data which can be played in the buffer is smaller than or equal to the preset minimum duration for the buffer, further determining whether a cumulative delay of the video-audio data is smaller than a preset maximum cumulative delay of video-audio data; when the cumulative delay of the video-audio data is smaller than the preset maximum cumulative delay of the video-audio data, performing time domain stretch processing for the video-audio data in the buffer; otherwise, not performing time domain stretch processing. In the method, the condition of performing time domain stretch processing is limited to a case that the cumulative delay of the video-audio data is smaller than the preset maximum cumulative delay of the video-audio data, so as to avoid that overmuch time domain stretch processing results in the infinite increase of the cumulative delay of the video-audio data, and further improve user experiences.

An stretch or compacting algorithm used in the stretch or compacting processing includes: for an audio data file, an algorithm such as a Synchronized Overlap Add (SOLA) algorithm and a Waveform Similarity Overlap and Add (WSOLA) algorithm, and some improved algorithms based on this type of algorithms are used to implement the stretch or compacting processing; for a video data file, a repeat inserting frame method is used, or a method in which adjacent two frames are combined into a middle frame is used to implement the stretch processing, and a video skip frame method is used to implement the compacting processing. The embodiments of the present invention do not limit the algorithm for implementing the stretch or compacting of the video-audio data file. The times of stretch or compacting of the video-audio data file may be configured by users, and is not limited by the embodiments of the present invention.

In addition, based on the above determining of the stretch processing, if the determining result is not to perform stretch processing, further determining is performed. If it is determined that the time difference is smaller than the total duration of playing the video-audio data which can be played in the buffer, or the total duration of playing the video-audio data which can be played in the buffer is larger than preset maximum duration for the buffer, the time domain compacting processing is performed for the video-audio data in the buffer; otherwise, the time domain compacting processing is not performed. The duration of playing the vide-audio data for which the time domain compacting processing is performed is not smaller than ½ times of the duration of playing the original video-audio data. In actual applications, the times can be adjusted, e.g. ⅓ times, ⅔ times or ¾ times, which is not limited by the embodiments of the present invention.

By performing the time domain compacting processing for the video-audio data in the buffer, the delay of playing the video-audio data can be decreased, so as to further improve user experiences, and make a receiving end adaptively play the video-audio data according to the receiving state of the video-audio data.

The method for controlling video-audio data playing is described hereinafter in detail by taking audio data as an example.

First, the following variables are configured:

$J_{pre}$: a time difference between a time point of receiving the latest audio data packet and a current time point;

$L_p$: duration of playing audio data which can be played in the buffer;

$D_{alg}$: a cumulative algorithm delay, i.e. a cumulative value of playing delay caused by the time domain stretch and compacting processing;

$D_{max}$: the upper limit of the cumulative algorithm delay, i.e. a maximum value that $D_{alg}$ can achieve;

$L_{min}$: the lower limit of the duration of playing audio data for the buffer;

$L_{max}$: the upper limit of the duration of playing audio data for the buffer;

$L_{out}$: duration of playing audio data which is taken away from the buffer each time;

$L_{stretch}$: duration increased by the stretch processing;

$L_{compact}$: duration decreased by the compacting processing;

The unit of the above duration of playing audio data or time is millisecond (ms).

Figure 3:
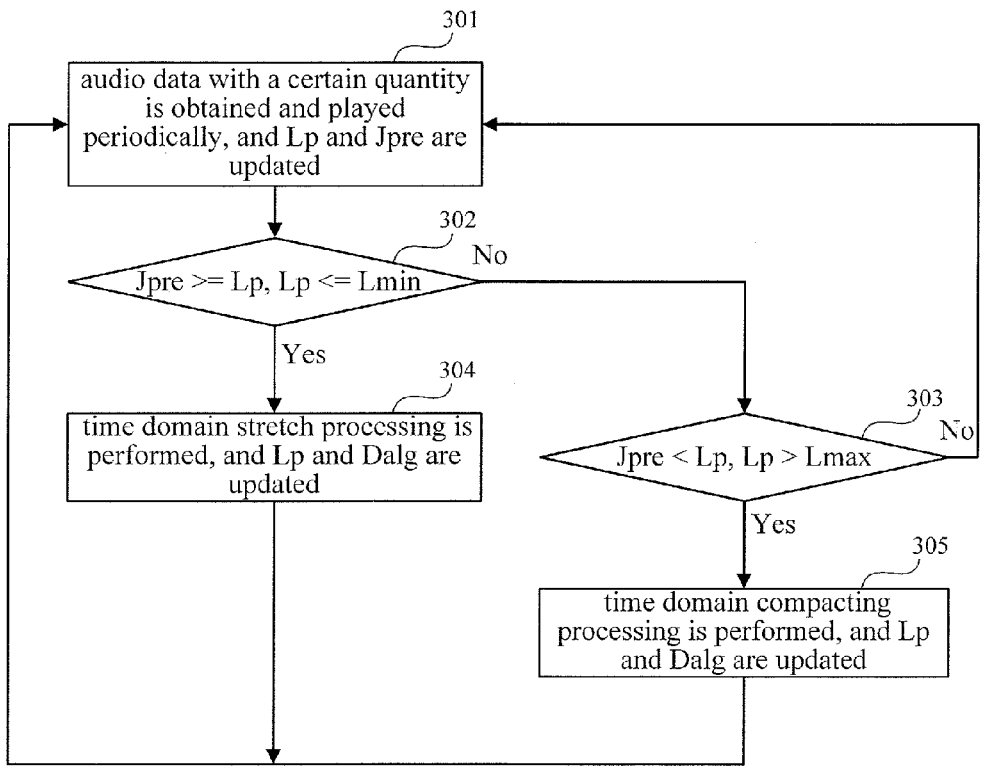
FIG. 3 is a schematic diagram illustrating the processing of a playing control procedure according to a first embodiment of the present invention.

FIG. 3 is a schematic diagram illustrating the processing of a playing control procedure according to a first embodiment of the present invention. As shown in FIG. 3, the playing control procedure includes the following steps.

Step 301: audio data with a certain quantity is obtained and played periodically, and $L_p$ and $J_{pre}$ are updated, where the updated $L_p = L_p$ before the update$-L_{out}$, and $J_{pre}$=a current time point−a time point of receiving the latest audio packet, the time point of receiving the latest audio packet is updated every time one audio packet is received.

Step 302: it is determined whether Jpre>=Lp or Lp<=Lmin; if Jpre>=Lp or Lp<=Lmin, Step 304 is performed; otherwise, Step 303 is performed.

Step 303: it is determined whether Jpre<Lp or Lp>Lmax; if Jpre<Lp or Lp>Lmax, Step 305 is performed; otherwise, Step 301 is performed.

Step 304: time domain stretch processing is performed for the audio data in the buffer, the processed audio data is stored in the buffer, Lp and Dalg are updated, where the updated Lp=Lp before the update+Lstretch, and the updated Dalg=Dalg before the update+Lstretch, and Step 301 is returned to.

Step 305: time domain compacting processing is performed for the audio data in the buffer, the processed audio data is stored in the buffer, Lp and Dalg are updated, where the updated Lp=Lp before the update−Lcompact, and the updated Dalg=Dalg before the update−Lcompact, and Step 301 is returned to.

In the above method, Lmin may be configured as different values according to specific applications, generally Lmin>=3*Lout. Since there may be no data in the buffer at the very start, the data in the buffer can not be played unless the duration of playing the data in the buffer is equal to Lmin, and thus some playing delay is increased.

Lmax may be determined according to the size of the buffer in specific applications, as long as a basic condition is met: Lmax>Lmin.

Lstretch: duration increased by the stretch processing, where a better effect can be achieved when the duration is not larger than the duration of playing the original data, and of cause the duration may be determined according to practical requirements.

Lcompact: duration decreased by the compacting processing, where a better effect can be achieved when the duration is not larger than ½ times of the duration of playing the original data, and of cause the duration may be determined according to practical requirements.

In the above playing control method, Lmin will introduce a constant playing delay, which increases a fixed playing delay. The time domain stretch processing also introduce a delay, which is determined by the duration increased by each stretch processing, and increases the playing delay. The time domain compacting processing decreases a delay, which is determined by the duration decreased by each compacting processing, and decreases the playing delay. The total playing delay may be decreased by the time domain compacting processing, so as to counteract the playing delay introduced by Lmin and the stretch processing.

In order to control the delay, the cumulative delay may be taken as a condition in the control algorithm. When the stretch processing is performed, Dalg is considered; if Dalg>=Dmax, the stretch processing is not performed, to avoid that a larger playing delay is introduced.

Figure 4:
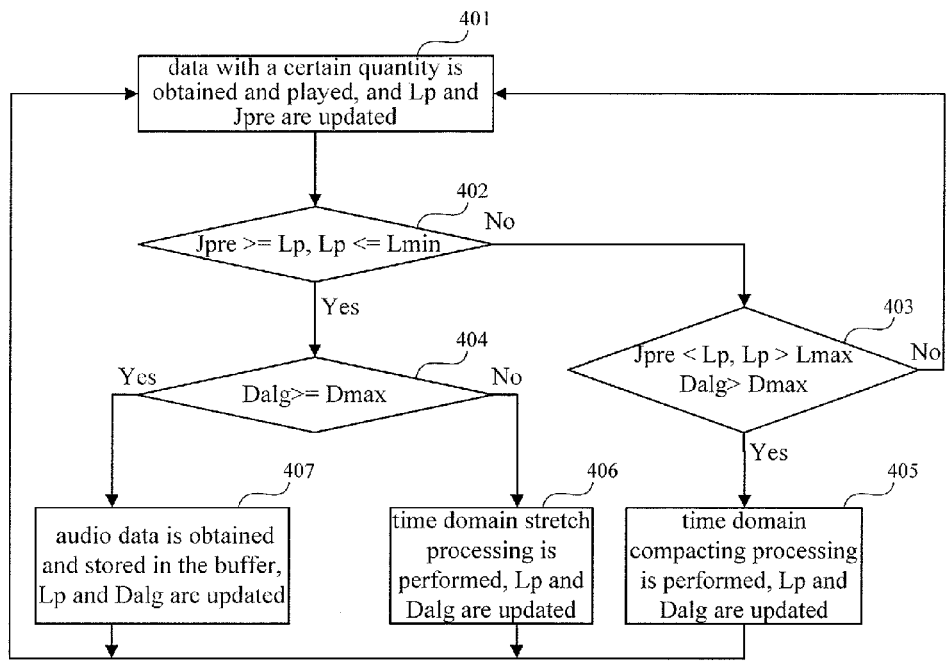
FIG. 4 is a schematic diagram illustrating the processing of a playing control procedure according to a second embodiment of the present invention.

FIG. 4 is a schematic diagram illustrating the processing of a playing control procedure according to a second embodiment of the present invention. As shown in FIG. 4, the playing control procedure includes the following steps.

Step 401: data with a certain quantity is obtained and played, and Lp and Jpre are updated.

Step 402: it is determined whether Jpre>=Lp or Lp<=Lmin; if Jpre>=Lp or Lp<=Lmin, Step 404 is performed; otherwise, Step 403 is performed.

Step 403: it is determined whether Jpre<Lp, Lp>Lmax or Dalg>Dmax; if Jpre<Lp, or Lp>Lmax, or Dalg>Dmax, Step 405 is performed; otherwise, Step 401 is performed.

Step 404: it is determined whether Dalg>Dmax; if Dalg>Dmax, Step 407 is performed; otherwise, Step 406 is performed.

Step 405: time domain compacting processing is performed for the data in the buffer, the processed data is stored in the buffer, Lp and Dalg are updated, and Step 401 is returned to.

Step 406: time domain stretch processing is performed for the data in the buffer, the processed data is stored in the buffer, Lp and Dalg are updated, and Step 401 is returned to.

Step 407: according to the data of the former frame, data with the certain quantity is obtained, the data is stored in the buffer, Lp and Dalg are updated, and Step 401 is returned to.

In the above two specific embodiments, the step of determining whether the compacting processing needs to be performed is not necessary, if the total playing delay does not need to be controlled, the step of determining whether the compacting processing needs to be performed and the step of performing the compacting processing are not necessary, and Step 403 may not include the step of determining whether Dalg>Dmax.

Figure 2:
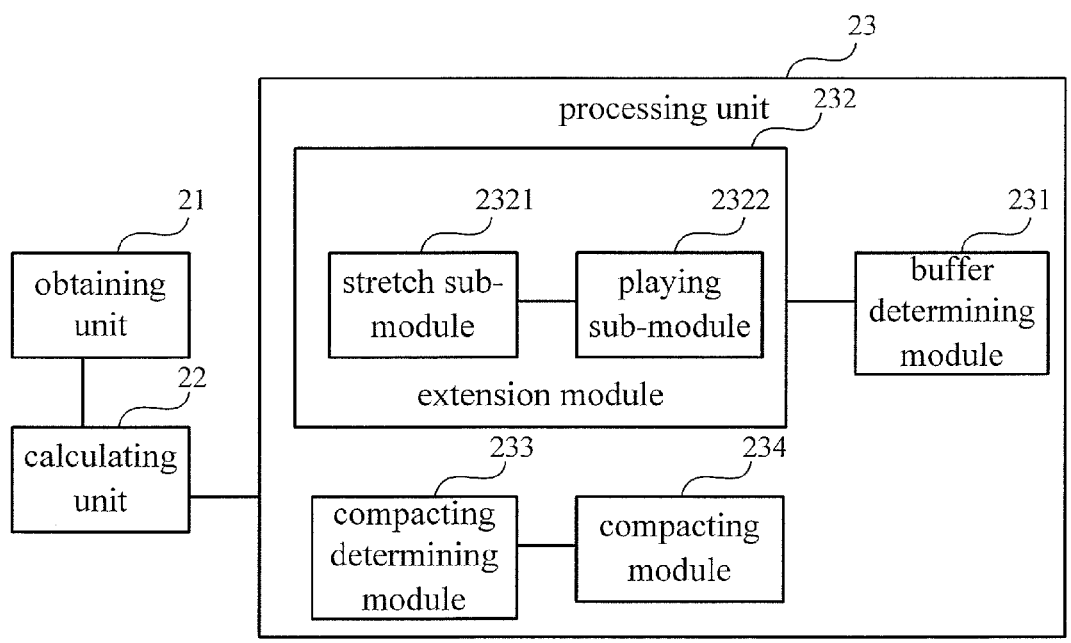
FIG. 2 is a schematic diagram illustrating the structure of an apparatus for controlling video-audio data playing according to an embodiment of the present invention.

The embodiments of the present invention also provide an apparatus for controlling video-audio data playing, as shown in FIG. 2. The apparatus includes: an obtaining unit 21, configured to obtain total duration of playing video-audio data which can be played in the buffer; a calculating unit 22, configured to calculate a time difference which is a difference between a current time point and a time point of receiving the latest video-audio data packet; a processing unit 23, configured to compare the time difference with a preset condition, perform time domain stretch processing for the video-audio data in the buffer, and play the processed video-audio data.

Preferably, the processing unit 23 may include: a buffer determining module 231, configured to determine whether the time difference is larger than or equal to the total duration of playing the video-audio data which can be played in the buffer, or the total duration of playing the video-audio data which can be played in the buffer is smaller than or equal to preset minimum duration for the buffer; an stretch module 232, configured to, when the determining result of the buffer determining module 231 is yes, i.e. when the buffer determining module 231 determines that the time difference is larger than or equal to the total duration of playing the video-audio data which can be played in the buffer, or the total duration of playing the video-audio data which can be played in the buffer is smaller than or equal to the preset minimum duration for the buffer, perform the time domain stretch processing for the video-audio data in the buffer, and play the video-audio data after the time domain stretch processing.

Preferably, the stretch module 232 may further include: an stretch sub-module 2321, configured to determine whether a cumulative delay of the video-audio data is smaller than the preset maximum cumulative delay of the video-audio data; the stretch module 232 is further configured to, when the determining result of the buffer determining module 231 is yes, determine whether to perform time domain stretch processing for the video-audio data in the buffer according to the determining result of the stretch sub-module 2321, when the determining result of the stretch sub-module 2321 is yes, i.e. when the stretch sub-module 2321 determines that the cumulative delay of the video-audio data is smaller than the preset maximum cumulative delay of the video-audio data, perform the time domain stretch processing for the video-audio data in the buffer; otherwise, not perform the time domain stretch processing; the stretch module 232 may further include a playing sub-module 2322, configured to play the video-audio data after the time domain stretch processing.

Preferably, the processing unit 23 may further include: a compacting determining module 233 and a compacting module 234. The compacting determining module 233 is configured to determine whether the time difference is smaller than the total duration of playing the video-audio data which can be played in the buffer, or the total duration of playing the video-audio data which can be played in the buffer is larger than preset maximum duration for the buffer.

The compacting module 234 is configured to, when the determining result of the compacting determining module 233 is yes, i.e. when the compacting determining module 233 determines that the time difference is smaller than the total duration of playing the video-audio data which can be played in the buffer, or the total duration of playing the video-audio data which can be played in the buffer is larger than the preset maximum duration for the buffer, perform time domain compacting processing for the video-audio data in the buffer, and play the video-audio data after the time domain compacting processing.

Preferably, the compacting determining module 233 is further configured to determine whether the cumulative delay of the video-audio data is smaller than or equal to the preset maximum cumulative delay of the video-audio data;

the compress module 234, further configured to, when the compacting determining module 233 determines that the cumulative delay of the video-audio data is smaller than or equal to the preset maximum cumulative delay of the video-audio data, perform time domain compacting processing for the video-audio data in the buffer.

According to the apparatus provided by the embodiments of the present invention, after the obtaining unit 21 obtains the total duration of playing the video-audio data which can be played in the buffer and the calculating unit 22 calculates the time difference, the buffer determining module 231 determines whether the time difference is larger than or equal to the total duration of playing the video-audio data which can be played in the buffer, or the total duration of playing the video-audio data which can be played in the buffer is smaller than or equal to the preset minimum duration for the buffer; if the determining result of the buffer determining module 231 is yes, the stretch module 232 performs the time domain stretch processing for the video-audio data in the buffer, and plays the video-audio data after the time domain stretch processing. By using the apparatus, the duration of playing the video-audio data in the buffer is increased, which increases the capacity of the buffer without increasing the size of the buffer, so as to provide more time for receiving other video-audio data packets by the receiving end, and decrease the incontinuity phenomena caused because the receiving end can not receive a data packet for a long time when the video-audio data is played. By using the apparatus, when the buffer determining module 231 determines that the time difference is smaller than the total duration of playing the video-audio data which can be played in the buffer, or the total duration of playing the video-audio data which can be played in the buffer is larger than the preset maximum duration for the buffer, the compacting module 234 performs the time domain compacting processing for the video-audio data in the buffer, and plays the video-audio data after the time domain compacting processing, so as to decrease the playing delay of video-audio data, improve user experiences, and adaptively play the video-audio data.

Those skilled in the art can understand that all or part of steps in the method provided by the embodiments of the present invention can be implemented by instructing related hardware by a program, the program may be stored a readable memory of a computer, and above method steps are included when the program is operated. The memory includes a ROM/RAM, a disk, a Compact Disc (CD) and so on.

To sum up, the technical solution provided by the embodiments of the present invention has an advantage of adaptively playing a data file.

The foregoing are only preferred embodiments of the present invention and are not for use in limiting the protection scope of the present invention. Any modification, equivalent replacement and improvement made within the scope of the present invention should be covered under the protection scope of the present invention. Therefore, the protection scope of the present invention should be defines according to the claims.

What is claimed is:

1. A method for controlling video-audio data playing, comprising:
   obtaining total duration of playing video-audio data which can be played in a buffer;
   calculating a time difference, the time difference being a difference between a current time point and a time point of receiving a latest video-audio data; and
   determining whether the time difference is larger than or equal to total duration of playing the video-audio data which can be played in the buffer, or whether the total duration of playing the video-audio data which can be played in the buffer is smaller than or equal to preset minimum duration for the buffer;
   determining whether a cumulative delay of the video-audio data is smaller than a preset maximum cumulative delay of video-audio data;
   performing time domain stretch processing for the video-audio data in the buffer, when the time difference is larger than or equal to total duration of playing the video-audio data which can be played in the buffer or the total duration of playing the video-audio data which can be played in the buffer is smaller than or equal to preset minimum duration for the buffer, and when the cumulative delay of the video-audio data is smaller than the preset maximum cumulative delay of the video-audio data; and
   playing the processed video-audio data.

2. The method of claim 1, if it is determined that it is not needed to perform the time domain stretch processing, further comprising:
   when determining that the time difference is smaller than the total duration of playing the video-audio data which can be played in the buffer, or the total duration of playing the video-audio data which can be played in the buffer is larger than preset maximum duration for the buffer, performing time domain compacting processing for the video-audio data in the buffer.

3. The method of claim 2, if it is determined that it is not needed to perform time domain stretch processing, further comprising:
   when determining that the cumulative delay of the video-audio data is smaller than or equal to the preset maximum cumulative delay of the video-audio data, performing time domain compacting processing for the video-audio data in the buffer.

4. An apparatus for controlling video-audio data playing, comprising:
   an obtaining unit, configured to obtain total duration of playing video-audio data which can be played in a buffer;

a calculating unit, configured to calculate a time difference, the time difference being a difference between a current time point and a time point of receiving a latest video-audio data packet; and a processing unit, configured to compare the time difference with a preset condition, perform time domain stretch processing for the video-audio data in the buffer according to a comparing result, and play the processed video-audio data;

wherein the processing unit comprises:

a buffer determining module, configured to determine whether the time difference is larger than or equal to the total duration of playing the video-audio data which can be played in the buffer, or the total duration of playing the video-audio data which can be played in the buffer is smaller than or equal to preset minimum duration for the buffer;

an stretch module, configured to, when the buffer determining module determines that the time difference is larger than or equal to the total duration of playing the video-audio data which can be played in the buffer, or the total duration of playing the video-audio data which can be played in the buffer is smaller than or equal to the preset minimum duration for the buffer, perform the time domain stretch processing for the video-audio data in the buffer, and play the video-audio data after the time domain stretch processing;

the stretch module further comprises:

an stretch sub-module, configured to determine whether a cumulative delay of the video-audio data is smaller than a preset maximum cumulative delay of the video-audio data; wherein the stretch module is further configured to, when the determining module determines that the time difference is larger than or equal to the total duration of playing the video-audio data which can be played in the buffer, or the total duration of playing the video-audio data which can be played in the buffer is smaller than or equal to the preset minimum duration for the buffer, and the stretch sub-module determines that the cumulative delay of the video-audio data is smaller than the preset maximum cumulative delay of the video-audio data, perform the time domain stretch processing for the video-audio data in the buffer; and a playing sub-module, configured to play the video-audio data after the time domain stretch processing.

5. The apparatus of claim 4, wherein the processing unit further comprises:

a compacting determining module, configured to determine whether the time difference is smaller than the total duration of playing the video-audio data which can be played in the buffer, or the total duration of playing the video-audio data which can be played in the buffer is larger than preset maximum duration for the buffer; and a compacting module, configured to, when the compacting determining module determines that the time difference is smaller than the total duration of playing the video-audio data which can be played in the buffer, or the total duration of playing the video-audio data which can be played in the buffer is larger than the preset maximum duration for the buffer, perform time domain compacting processing for the video-audio data in the buffer, and play the video-audio data after the time domain compacting processing.

6. The apparatus of claim 5, wherein the compacting determining module, is further configured to determine whether the cumulative delay of the video-audio data is smaller than or equal to the preset maximum cumulative delay of the video-audio data;

the compacting module, further configured to, when the compacting determining module determines that the cumulative delay of the video-audio data is smaller than or equal to the preset maximum cumulative delay of the video-audio data, perform time domain compacting processing for the video-audio data in the buffer.

* * * * *